Patented Aug. 7, 1951

2,562,902

UNITED STATES PATENT OFFICE 2,562,902

METHOD OF TESTING WAX

Karl A. Fischer, Washington, D. C.

No Drawing. Application May 13, 1948,
Serial No. 26,914

11 Claims. (Cl. 73—432)

(Granted under the act of March 3, 1883, as
amended April 30, 1928; 370 O. G. 757)

The invention described herein, if patented, may be manufactured and used by or for the Government for governmental purposes without the payment to me of any royalty thereon.

This invention relates to a method for the determination of the oil content in waxes. More particularly the invention is concerned with the addition of an oil soluble and crystallizable coloring matter to molten paraffinic waxes and subsequent crystallization of the wax with or without recrystallization of the coloring matter.

It has been discovered that paraffin crystals, in contrast to other crystalline material, have no tendency to include oil or liquid. Particularly, paraffin waxes in molten form have been found to be a solubilizing agent for coloring matter in the nature of sudan dyes and alizarin dyes. Upon crystallization, however such coloring matter is not retained by the paraffin crystals which also excludes oils. The oil which may be contained by a molten wax composition, however, tends to adhere to the surface of the wax crystals in minute quantities unless the crystals are thoroughly and completely washed. In the usual practice of wax production it has been difficult to determine the freedom of wax from oils thereby causing the wax in many instances to retain an oil contamination of unknown value.

It is, therefore, an object of this invention to provide a means for determining the oil content of waxes.

It is another object of this invention to provide a method of determining or measuring the relative purity of waxy material by incorporating in a liquid waxy composition an oil-soluble dye stuff or coloring matter which is soluble in the liquid or uncrystallized wax composition but insoluble in crystallized wax, and by reason of the solubility of the coloring agent in the components of the liquid wax composition and the solubility of the coloring agent in a wax component of the composition, when the wax is in its crystallized state, evaluating the color change by exclusion of the coloring agent from the wax in its crystallized state.

It is a further object of this invention to provide a method for determining the freedom of waxes from oils without the need for microscopic examination.

The method of utilizing a dye stuff which is oil soluble and soluble in molten wax involves the admixture of a minute quantity of crystallizable dye stuff or other similar crystallizable coloring matter with a small sample of the molten wax. The wax and coloring matter is then cooled to a crystal stage which leaves the color substance either in a crystallized form, if no oil is present, or in solution in the oil.

In the practice of this invention, it has been found that a sudan dye stuff, for example, sudan red in the very minute proportion of 0.05 to 0.10% may be mixed with and is soluble in a very small sample of melted wax. This dye stuff is very intense and has the property of being soluble in the wax while it is in a molten stage and also in the oil content of the wax, if any. A small sample of the mixture, as a drop, may be placed upon a glass slide and this sample thereafter cooled to crystallize the wax and dye stuff material without solidifying the mixture of dye stuff and oil, if oil is present. If oil is present with the wax, it will keep the dye stuff in solution in the form of colored spots with undefined boundary. The shade of this color will vary in proportion to the oil content and may be used with a prepared table of standard wax samples having known oil contents on a comparative basis and tabulated in wax percentages or oil percentages as desired.

Strikingly, the color shade of the crystallized dye stuff is different from that of the dissolved dye stuff. For example, in the absence of oil, sudan red crystallizes and the crystals have a bluish-fuchsia red tint whereas if retained in solution the coloring is a yellowish-salmon red tint. Various quantities of oil content will likewise cause graduated respective shades or tints with similar and other oil soluble and crystallizable coloring matter in the nature of the dye stuff series indicated.

Likewise, for example, an alizarin dye stuff as alizarin-irisolblue will show a color effect which may be readily determined. As herein set forth, the oil-soluble sudan and alizarin coloring agents, soluble in molten wax and insoluble in solidified wax are applicable for making determinative color readings of waxy compositions.

For a definition of sudan dyes, reference is made to Hackh's Chemical Dictionary, 3rd ed., 1944, page 815, listing the following sudan dyes:

Sudan I (sudan yellow); aniline azo-beta-naphthol

Sudan II, a brown dye; xylidine azo-beta-naphthol

Sudan III, sudan red; aminoazobenzeneazo-beta-naphthol

Sudan IV, Scarlet Red; toluene-azo-toluene-azo-beta-naphthol (at page 758).

These sudan dyes are thus characterized by a beta-naphthol group attached to another aromatic group by an azo (—N=N—) linkage.

Alizarin-irisolblue is listed in the Colour Index of the Society of Dyers and Colourists, 1924, as No. 1073 alizarin-irisol D, R, with the structural formula

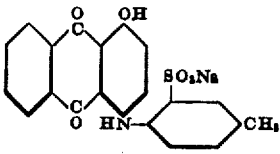

Alizarin is defined in Hackh's Chemical Dictionary, 3rd ed., 1944, page 31, as an anthraquinone derivative. The anthraquinone group

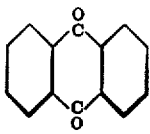

characterizes the alizarin-irisolblue and 25 alizarin dyes tabulated on the same page of the chemical dictionary. The term "alizarin dye" is thus used in the sense of anthraquinone derivative dyes.

The color shades or tints produced, particularly when using a brilliant or vivid dye stuff for making comparison tests may be observed by the eye without requiring microscopic examination. However, in making these tests some care is necessary, as in all crystallizing problems, in keeping the time constant between preparation of the sample and making an examination either with or without a microscope as desired. This time interval requires approximately from five to ten minutes before an evaluation of a reliable result can be obtained. Further during this time interval and during the examination suitable low temperatures are maintained for the crystalline material to keep it in the crystalline stage.

Preferably as indicated only a trace of the dye stuff or coloring agent is added to the wax material undergoing investigation. As heretofore indicated, examination of the crystallized substance indicates by color separation, the presence or non-presence of oil. If desired, the wax crystals may be observed under a microscope and it will be seen that the dye or coloring material is resting beside the entirely colorless paraffin crystals.

It has been discovered that the above method may be utilized particularly to estimate the percentage of small quantities of oil in brown coal tar paraffin and mineral oil waxes as with high molecular ceresinic waxes results may be comparative but are not conclusive. For example, the method is preferably used with relatively purified wax material of the character described, which may contain from 5% to no oil. A wax product having larger percentage of oil will color the field of vision, due to its being relatively unifo.m.y dispersed over the wax crystals and retaining the dye stuff in solution.

Having thus described my invention, it will be apparent that standardization systems and methods can be established for testing the oil content in waxes or in plant control work and other uses which may come within the scope of the appended claims.

I claim:

1. The method of determining the oil content of waxes by the addition of an oil soluble and crystallizable dye stuff which is soluble in liquid wax and insoluble in crystallized wax, comprising incorporating an oil-soluble dye in a liquid wax material, solidifying the wax, and determining the color change of the dye.

2. The method of determining the oil content of waxes by an addition of a sudan dye characterized by a beta-naphthol group attached to another aromatic group by an azo linkage which is soluble in molten wax and insoluble in crystallized wax, comprising incorporating an oil-soluble sudan dye in molten wax, solidifying the wax, and determining the color change of the dye.

3. The method of determining oil content of waxes by an addition of anthraquinone derivative oil-soluble alizorin dye stuffs which are soluble in molten wax and insoluble in crystallized wax, comprising incorporating an oil-soluble alizarin dye in molten wax, solidifying the wax, and determining the color effect of the dye.

4. The method of determining the oil content of wax material in the nature of brown coal tar waxes and mineral oil waxes by the addition of coloring matter being a member of the group consisting of oil-soluble and crystallized-wax-insoluble sudan dye characterized by a beta-naphthol group attached to another aromatic group by an azo linkage and oil-soluble and crystallized-wax-insoluble anthraquinone derivative alizarin dye, comprising incorporating said coloring matter in melted wax in which the coloring matter is soluble, subsequently crystallizing the wax material to separate the coloring matter therefrom as a material insoluble in the crystallized wax material, and evaluating the effect of the coloring matter.

5. The method of determining the oil content of wax material in the nature of brown coal tar waxes and mineral oil waxes by the addition of oil-soluble alizarin-irisolblue dye stuff comprising incorporating the dye in melted wax in which the dye is soluble, subsequently crystallizing the wax material to separate the dye therefrom in which the dye is soluble, as a material insoluble in the crystallized wax material, and determining the effect of the dye.

6. The method of determining the oil content of a wax sample by a comparative test, comprising adding a coloring agent being a member of the class consisting of oil-soluble and crystallized-wax-insoluble sudan dye characterized by a beta-napthol group attached to another aromatic group by an azo linkage and oil-soluble and crystallized-wax-insoluble anthraquinone derivative alizarin dye in the proportion of 0.05 to 0.10% to molten wax, crystallizing the wax and comparing the sample's coloring with a standard.

7. The method of determining the oil content of a wax sample by a comparative test comprising adding an oil-soluble and solidified-wax-insoluble crystallizable coloring matter in the proportion of 0.05 to 0.10% to molten wax, crystallizing the wax and comparing the sample's coloring with a standard.

8. The method of determining the oil content of waxes by the addition of an oil soluble crystallizable coloring material which is soluble in molten wax and insoluble in crystallized wax, comprising dissolving the coloring matter in a liquid wax, solidifying the wax to exclude the coloring matter, and determining the coloring change.

9. The method of determining the purity of a waxy material by the addition of an oil-soluble and crystallized-wax-insoluble sudan red coloring agent characterized by a beta-napthol group attached to another aromatic group by an azo linkage, comprising incorporating the coloring agent in liquid waxy material in which the coloring agent is soluble, subsequently crystallizing the wax material to separate the coloring agent from the crystalline wax, and determining the change of color in the coloring agent.

10. The method of determining the wax content of a waxy composition by the addition of an oil-soluble coloring agent which is soluble in uncrystallized wax and insoluble in crystallized wax comprising incorporating in uncrystallized waxy composition an oil-soluble coloring matter, crystallizing the wax to exclude the coloring matter, and determining the color effect of the excluded coloring matter.

11. The method of determining the wax content of a waxy composition by the addition of an oil-soluble coloring agent which is soluble in uncrystallized wax and insoluble in crystallized wax comprising incorporating in uncrystallized waxy composition an oil-soluble coloring matter in an amount of at least 0.05% coloring agent to the waxy composition, crystallizing the wax to exclude the coloring matter, and determining the color effect of the excluded coloring matter.

KARL A. FISCHER.

REFERENCES CITED

The following references are of record in the file of this patent:

UNITED STATES PATENTS

| Number | Name | Date |
|---|---|---|
| 2,113,302 | Hickman | Apr. 5, 1938 |